(12) United States Patent
Nakano

(10) Patent No.: US 10,338,316 B2
(45) Date of Patent: Jul. 2, 2019

(54) POLARIZATION DISPERSION ADDER AND OPTICAL RECEIVER

(71) Applicant: NEC Corporation, Tokyo (JP)

(72) Inventor: Takehiro Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/504,721

(22) PCT Filed: Aug. 19, 2015

(86) PCT No.: PCT/JP2015/004145
§ 371 (c)(1),
(2) Date: Feb. 17, 2017

(87) PCT Pub. No.: WO2016/031187
PCT Pub. Date: Mar. 3, 2016

(65) Prior Publication Data
US 2017/0254957 A1    Sep. 7, 2017

(30) Foreign Application Priority Data
Aug. 28, 2014  (JP) ................................ 2014-173766

(51) Int. Cl.
*H04B 10/04*    (2006.01)
*G02B 6/27*    (2006.01)
(Continued)

(52) U.S. Cl.
CPC ........... *G02B 6/2766* (2013.01); *G02B 6/278* (2013.01); *G02B 6/2938* (2013.01); *G02F 1/01* (2013.01);
(Continued)

(58) Field of Classification Search
CPC .. H04B 10/532; H04B 10/616; H04B 10/612; H04B 10/613; H04B 10/6161;
(Continued)

(56) References Cited

U.S. PATENT DOCUMENTS 8,478,135 B2 *  7/2013  Xie ...................... H04B 10/611
                                                 398/147
2004/0062552 A1  4/2004  Moeller
(Continued)

FOREIGN PATENT DOCUMENTS

CN    102204132 A    9/2011
CN    106797251 A    5/2017
(Continued)

OTHER PUBLICATIONS

International Search Report corresponding to PCT/JP2015/004145, 3 pages, dated Oct. 13, 2015.
(Continued)

*Primary Examiner* — Hanh Phan
(74) *Attorney, Agent, or Firm* — Wilmer Cutler Pickering Hale and Dorr LLP

(57) ABSTRACT

In order to provide a configuration for suppressing deterioration in the transmission quality of a signal light due to a nonlinear phenomenon in an optical fiber, a polarization dispersion adder is provided with: a polarization rotation unit which, with respect to each pulse of signal light generated by modulating a light carrier, rotates and outputs the polarization of the pulse during a period from a pulse rise start time (T0) to a pulse fall completion time (T1); and a delay addition unit which adds a delay of an amount corresponding to the rotation amount of the polarization added by the polarization rotation unit to the pulse outputted from the polarization rotation unit.

18 Claims, 9 Drawing Sheets

(51) Int. Cl.
*G02F 1/01* (2006.01)
*H04B 10/2543* (2013.01)
*H04J 14/04* (2006.01)
*H04J 14/06* (2006.01)
*G02B 6/293* (2006.01)
*H04B 10/532* (2013.01)
*H04B 10/58* (2013.01)
*H04J 14/02* (2006.01)
*H04B 10/50* (2013.01)
*H04B 10/61* (2013.01)

(52) U.S. Cl.
CPC ..... *H04B 10/2543* (2013.01); *H04B 10/5053* (2013.01); *H04B 10/532* (2013.01); *H04B 10/58* (2013.01); *H04B 10/614* (2013.01); *H04B 10/6162* (2013.01); *H04J 14/02* (2013.01); *H04J 14/04* (2013.01); *H04J 14/06* (2013.01)

(58) Field of Classification Search
CPC ........ H04B 10/671; H04J 14/06; H04J 14/04; H04J 14/02
USPC ....... 398/183, 184, 188, 192, 193, 194, 195, 398/201, 158, 159, 147, 81, 162, 202, 398/208, 65, 152, 204, 205, 209
See application file for complete search history.

(56) References Cited

U.S. PATENT DOCUMENTS

| | | |
|---|---|---|
| 2010/0232788 A1 | 9/2010 | Cai |
| 2010/0232805 A1 | 9/2010 | Cai |
| 2011/0170869 A1* | 7/2011 | Mandai ................... H04J 14/06 398/65 |
| 2013/0258453 A1 | 10/2013 | Arahira |
| 2013/0259479 A1* | 10/2013 | Mizuguchi ......... H04B 10/2507 398/65 |
| 2014/0212136 A1 | 7/2014 | Akiyama et al. |
| 2015/0131996 A1* | 5/2015 | Izumi ................... H04B 10/671 398/65 |

FOREIGN PATENT DOCUMENTS

| | | |
|---|---|---|
| EP | 1404038 A1 | 3/2004 |
| EP | 2763333 A1 | 8/2014 |
| JP | 2004-129239 A | 4/2004 |
| JP | 2004-511128 A | 4/2004 |
| JP | 2006-238334 A | 9/2006 |
| JP | 2012-222811 A | 11/2012 |
| JP | 2013-162136 A | 8/2013 |
| JP | 2013-205711 A | 10/2013 |
| JP | 2014-150371 A | 8/2014 |
| WO | WO-2004/064315 A1 | 7/2004 |
| WO | WO-2013/124986 A1 | 8/2013 |

OTHER PUBLICATIONS

Written Opinion of International Searching Authority corresponding to PCT/JP2015/004145 with English translation, 10 pages, dated Oct. 13, 2015.

Mantzoukis, Nikolaos et al., Performance Comparison of Electronic PMD Equalizers for Coherent PDM QPSK Systems, Journal of Lightwave Technology, vol. 29, Issue 11, Apr. 5, 2011, pp. 1721-1728.

Extended European Search Report issued by the European Patent Office for European Application No. 15835989.3 dated Apr. 6, 2018 (14 pages).

Menyuk, Curtis R., "Interaction of nonlinearity and polarization mode dispersion," Journal of Optical and Fiber Communications Reports, vol. 1, No. 4, pp. 305-311 (Dec. 1, 2004).

Mimura, Y., et al., "PMD Compensator and PMD Emulator," Furukawa Review, vol. 24, pp. 23-28 (Jan. 1, 2003).

Wu, H., et al., "Comparison of different modulation formats for polarization mode dispersion compensators," Proc. SPIE, vol. 6353, Optical Transmission, Switching, and Subsystems IV, pp. 63530W-1-63530W-10 (Sep. 21, 2006).

Chinese Office Action issued in corresponding Chinese Patent Application No. 201580046486.5, dated Aug. 30, 2018, (24 pages).

* cited by examiner

POLARIZATION DISPERSION ADDER AND OPTICAL RECEIVER

CROSS-REFERENCE TO RELATED APPLICATIONS

This application is a national stage application of International Application No. PCT/JP2015/004145 entitled "POLARIZATION DISPERSION ADDER AND OPTICAL RECEIVER," filed on Aug. 19, 2015, which claims the benefit of the priority of Japanese Patent Application No. 2014-173766 filed on Aug. 28, 2014, the disclosures of each of which are hereby incorporated by reference in their entirety.

TECHNICAL FIELD

The present invention relates to a polarization dispersion adder and an optical receiver, and more particularly, to a technology for suppressing deterioration in the transmission quality of signal light due to a non-linear phenomenon occurring in an optical fiber transmission path.

BACKGROUND ART

To enlarge capacity of an optical fiber transmission system, a digital coherent system has been in practical use. FIG. 11 is a block diagram illustrating a configuration of a general optical transmitter 800 used in a digital coherent system.

The optical transmitter 800 includes a light source 1, optical modulators 2 and 12, and a polarization multiplexer 5. The light source 1 outputs CW (continuous wave) light having a predetermined wavelength. The CW light outputted by the light source 1 is bifurcated. The bifurcated CW lights are subjected to phase modulation and intensity modulation in the optical modulators 2 and 12 by transmitted information, and become signal light. The optical modulator 2 is an optical modulator for X polarization and the optical modulator 12 is an optical modulator for Y polarization. The modulated X polarization-side signal light and the modulated Y polarization-side signal light are multiplexed in the polarization multiplexer 5 as signal light whose polarized waves are orthogonal to each other (orthogonal polarization multiplexing).

Since the configuration and operation of an optical transmitter used in a general digital coherent system are well-known, a detailed description of each unit of FIG. 11 is omitted.

FIG. 12 is a block diagram illustrating a configuration of a general optical receiver 810 used in a digital coherent system.

The optical receiver 810 includes a PBS (polarization beam splitter) 21, optical hybrid circuits 22 and 23, an AD (analog to digital) conversion unit 24, and a wavelength dispersion compensation unit 25. The optical receiver 810 further includes an adaptive equalization unit 27, a frequency offset compensation unit 28, a carrier phase estimation unit 29, and an identification determination unit 30.

Transmitted signal light is bifurcated in the PBS 21 and is mixed with local light in the optical hybrid circuits 22 and 23. The optical hybrid circuits 22 and 23 convert the signal light into analog electrical signals for output. General optical hybrid circuits 22 and 23 output analog electrical signals each having an I (in-phase) component and a Q (quadrature) component from one polarization signal. Therefore, the optical hybrid circuits 22 and 23 output four analog electrical signal in total. The analog electrical signals are converted into digital electrical signals in the AD conversion unit 24, and are outputted as a digital reception signal.

The digital reception signal is subjected to digital signal processing in the wavelength dispersion compensation unit 25, the adaptive equalization unit 27, the frequency offset compensation unit 28, the carrier phase estimation unit 29, and the identification determination unit 30, so that the transmitted signal is demodulated. The wavelength dispersion compensation unit 25 mainly compensates for static deterioration of the signal light such as wavelength dispersion of an optical transmission path. The adaptive equalization unit 27 mainly compensates for dynamic deterioration of the signal light such as polarization fluctuation. The adaptive equalization unit 27 also performs polarization division of the reception signal. The frequency offset compensation unit 28 compensates for a frequency difference between an optical carrier and local light of the optical receiver. The carrier phase estimation unit 29 compensates for a phase difference between the optical carrier and the local light. The identification determination unit 30 identifies data included in the reception signal. Since the configuration and operation of the optical receiver used for the general digital coherent system are well-known, a more detailed description of each unit of FIG. 12 is omitted.

In relation to the present invention, PTL 1 discloses a communication system including a polarization compensator in a transmitter and a receiver. PTL 2 discloses an optical communication system including a modulation system for reducing inter-polarization crosstalk. PTL 3 discloses an optical communication method for ensuring anonymity of information by polarization mode dispersion.

CITATION LIST

Patent Literature

[PTL 1] PCT Japanese Translation Patent Publication No. 2004-0511128 (paragraphs [0110] to [0122])

[PTL 2] Japanese Unexamined Patent Application Publication No. 2012-222811 (paragraph [0040], FIG. 4)

[PTL 3] International Publication No. 2004/064315 (row 34 of page 5 to row 46 of page 6)

SUMMARY OF INVENTION

Technical Problem

In the optical transmission system using the digital coherent technology, in order to increase a transmission capacity, a multi-valued configuration based on the phase and intensity of an optical carrier is achieved as well as polarization multiplexing of the optical carrier. On the other hand, in an ultra long distance optical fiber transmission system, it is widely known that a non-linear optical effect of an optical fiber has an influence on the transmission quality of signal light. The non-linear optical effect, for example, includes self-phase modulation, cross-phase modulation, and cross-polarization modulation.

Therefore, there is an increased importance for a technology for improving proof strength against deterioration in the transmission quality of signal light due to a non-linear phenomenon by attenuating or compensating for the deterioration of the signal light due to the non-linear phenomenon occurring in an optical fiber. However, all the above described general optical transmitter and optical receiver as well as the technology disclosed in PTLs 1 to 3 have no function for attenuating or compensating for the deterioration in the transmission quality of the signal light due to the non-linear phenomenon in the optical fiber. Therefore, these well-known technologies are not able to improve proof strength against the non-linear phenomenon of the signal light.

Object of Invention

The example object of the present invention is to provide a technology for suppressing deterioration in the transmission quality of signal light due to a non-linear phenomenon in an optical fiber.

Solution to Problem

A polarization dispersion adder of the present invention includes polarization rotation means for rotating polarization of a pulse for each pulse of signal light generated by modulating a optical carrier during a period from a rise start time T0 of the pulse to a fall completion time T1 of the pulse and outputting the pulse, and delay addition means for adding an amount of delay corresponding to an amount of rotation of the polarization added by the polarization rotation means to the pulse outputted from the polarization rotation means.

A optical receiver of the present invention includes a polarization beam splitter for polarization-splitting received signal light, an optical hybrid circuit for converting the polarization-split signal light into an analog electrical signal, AD (analog to digital) conversion means for converting the analog electrical signal into a digital reception signal, and polarization mode dispersion compensation means for compensating for polarization mode dispersion included in the signal light and added at a time of transmission of the signal light.

A polarization dispersion addition method of the present invention includes rotating polarization of a pulse for each pulse of signal light generated by modulating an optical carrier during a period from a rise start time T0 of the pulse to a fall completion time T1 of the pulse and adding an amount of delay corresponding to an amount of rotation of the polarization added by the rotation to the pulse subjected to the rotation of the polarization.

Advantageous Effects of Invention

The present invention achieves an effect that it is possible to suppress deterioration in the transmission quality of signal light due to a non-linear phenomenon in an optical fiber.

DESCRIPTION OF EMBODIMENTS

First Example Embodiment

Figure 1:
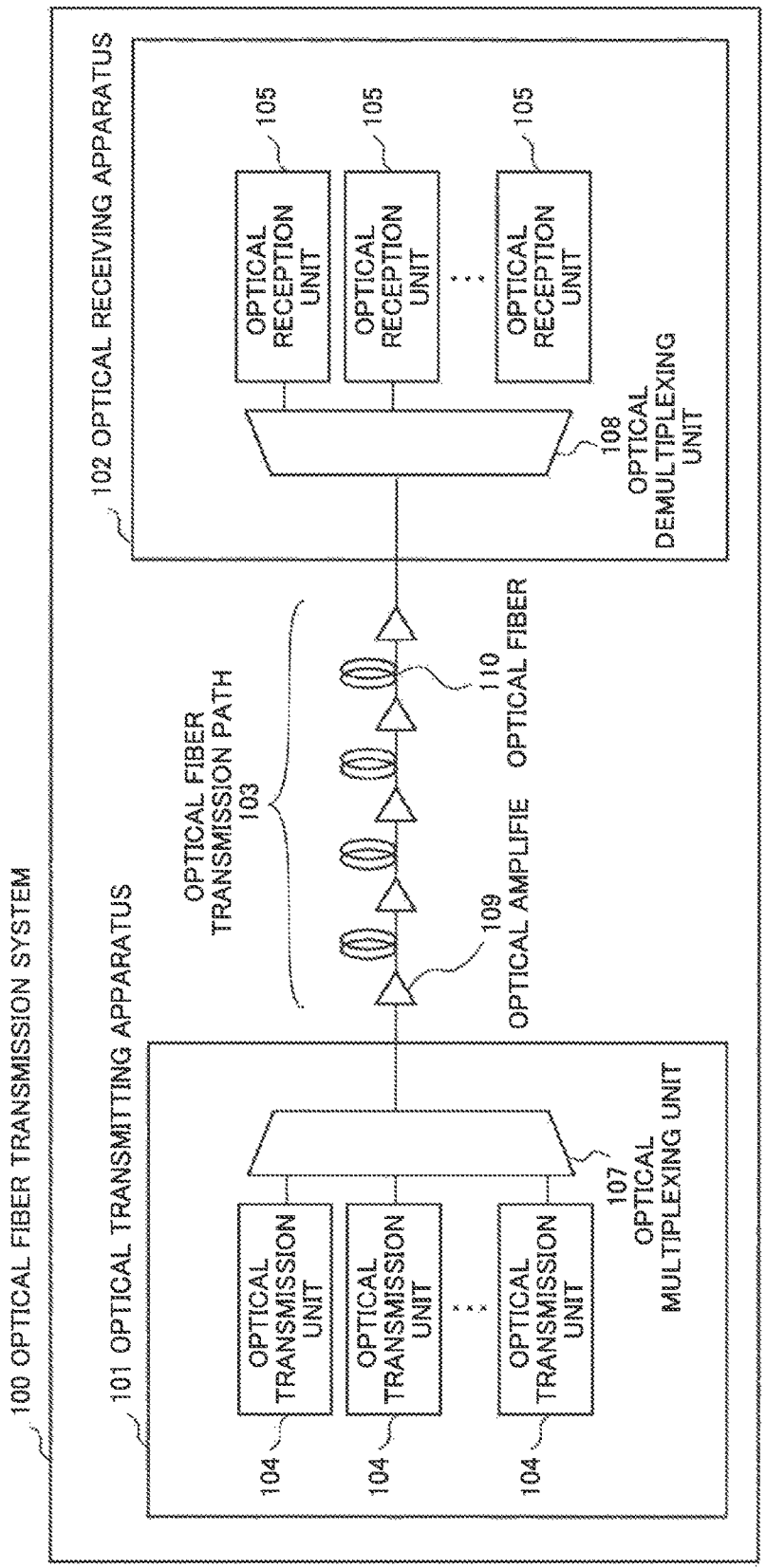
FIG. 1 is a diagram illustrating a configuration of an optical fiber transmission system of a first example embodiment.

FIG. 1 is a diagram illustrating a configuration of an optical fiber transmission system 100 of a first example embodiment of the present invention. The optical fiber transmission system 100 includes an optical transmitting apparatus 101, an optical receiving apparatus 102, and an optical fiber transmission path 103. Signal light transmitted from the optical transmitting apparatus 101 propagates through the optical fiber transmission path 103 and is received in the optical receiving apparatus 102.

The optical transmitting apparatus 101 sends digital coherent WDM (wavelength division multiplexing) signal light, in which a plurality of wavelengths have been multiplexed, to the optical fiber transmission path 103. The optical fiber transmission path 103 includes an optical fiber 110 and an optical amplifier 109, and transmits the WDM signal light to the optical receiving apparatus 102.

The optical transmitting apparatus 101 includes an optical multiplexing unit 107 and one or more optical transmission units 104. The optical transmission units 104 respectively generate coherent-modulated signal light having different wavelengths. The optical multiplexing unit 107 wavelength-multiplexes the plurality of types of signal light generated in the optical transmission units 104 to generate WDM signal light, and sends the WDM signal light to the optical fiber transmission path 103.

The optical receiving apparatus 102 includes an optical demultiplexing unit 108 and one or more optical reception units 105. The optical demultiplexing unit 108 demultiplexes the WDM signal light received from the optical fiber transmission path 103 into signal light having a single wavelength. The optical reception units 105 receive the signal light outputted from the optical demultiplexing unit 108 and reproduce transmitted information.

At least one of the optical transmission unit 104 and the optical reception unit 105 illustrated in FIG. 1 may have a optical transmission/reception function. That is, the optical transmission unit 104 may be a transmission unit of an optical transceiver. Furthermore, the optical reception unit 105 may be a reception unit of the optical transceiver.

Figure 2:
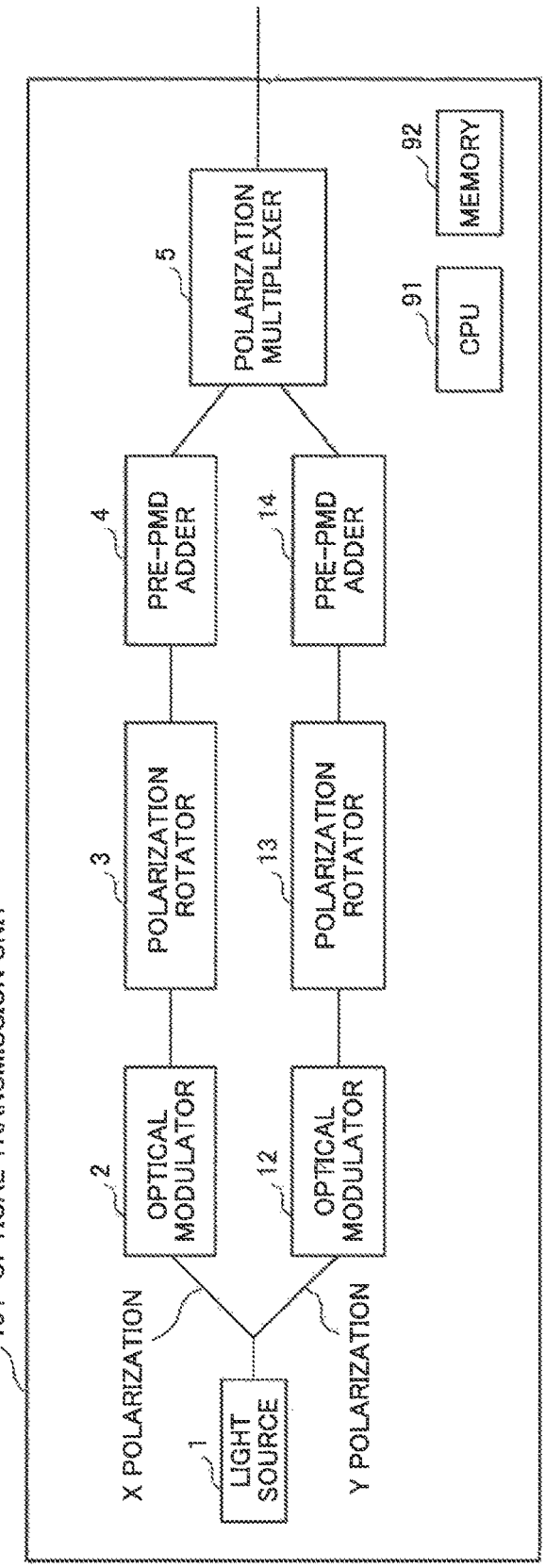
FIG. 2 is a block diagram illustrating a configuration of an optical transmission unit.
Figure 3:
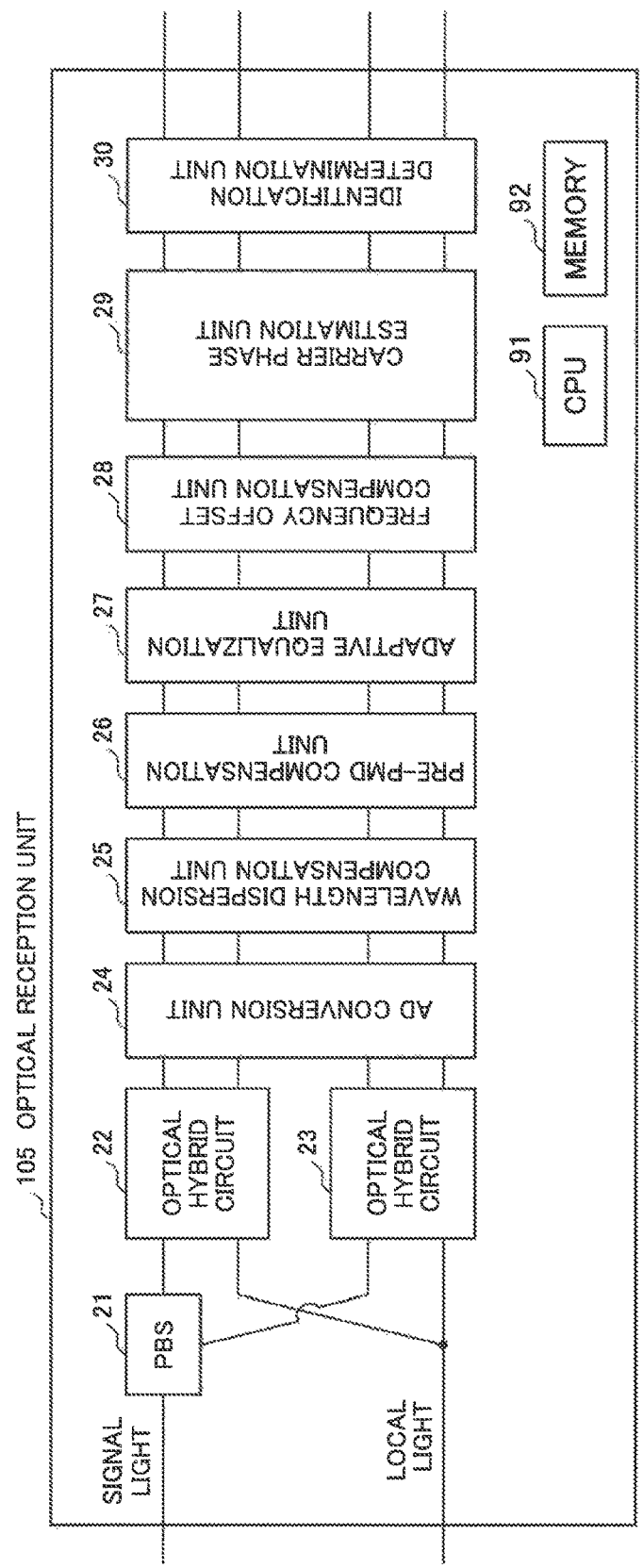
FIG. 3 is a block diagram illustrating a configuration of an optical reception unit.

FIG. 2 is a block diagram illustrating a configuration of the optical transmission unit 104. FIG. 3 is a block diagram illustrating a configuration of the optical reception unit 105. The optical transmission unit 104 transmits coherent-modulated signal light. The optical reception unit 105 receives the coherent-modulated signal light and demodulates the coherent-modulated signal light by digital signal processing.

The optical transmission unit 104 includes a light source 1, optical modulators 2 and 12, polarization rotators 3 and 13, pre-PMD adders 4 and 14, and a polarization multiplexer 5. The optical transmission unit 104 may further include a CPU (central processing unit) 91 and a memory 92. The memory 92 stores a program that is executed in the CPU 91. The memory 92 is a non-transitory storage medium, and for example, is configured with a non-volatile semiconductor memory and a volatile semiconductor memory. However, the configuration of the memory 92 is not limited thereto. The CPU 91 may execute the program stored in the memory 92, thereby controlling each element of the optical transmission unit 104 and performing the functions of the optical transmission unit 104.

Hereinafter, in order to distinguish polarization mode dispersion (hereinafter, referred to as "PMD") added in the optical transmission unit 104 from PMD occurring in a transmission path and the like, the PMD added in the optical transmission unit 104 is referred to as "pre-PMD".

Figure 11:
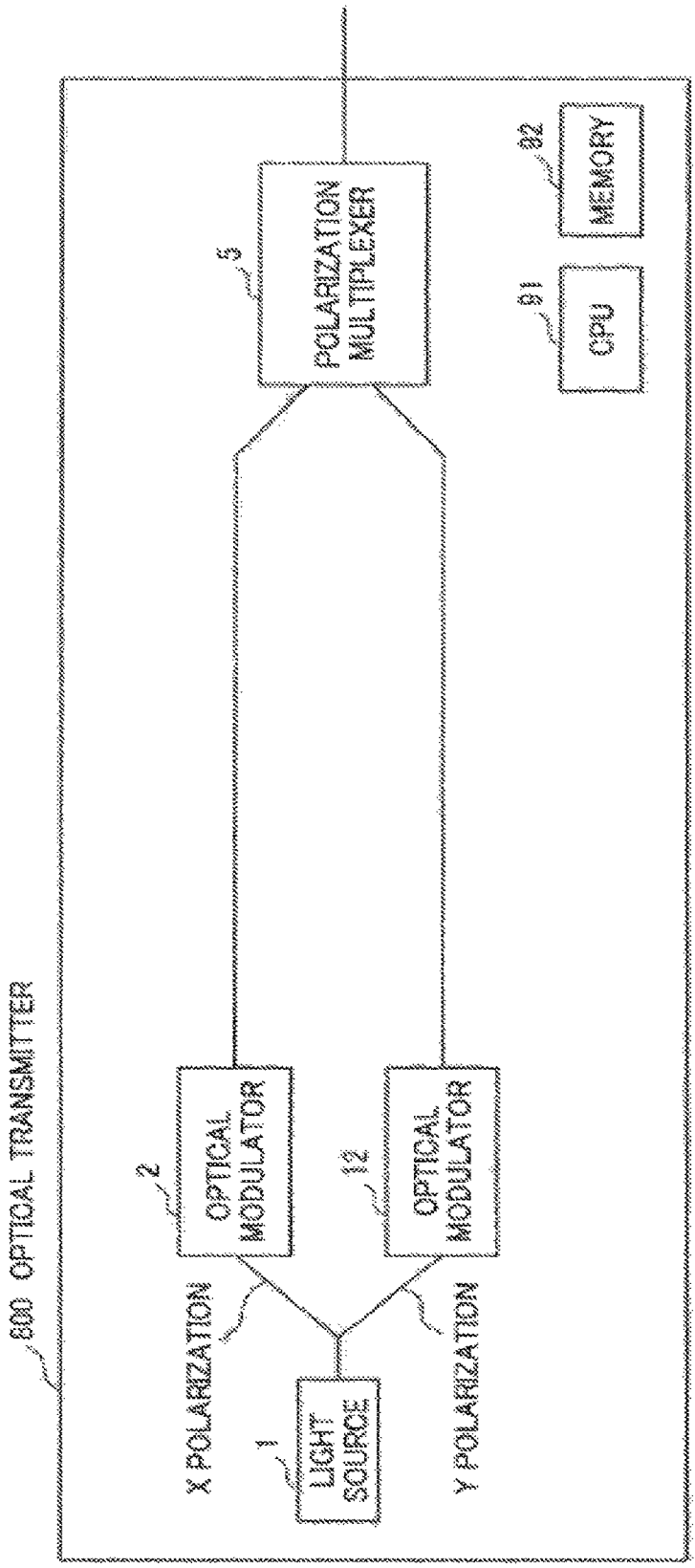
FIG. 11 is a block diagram illustrating a configuration of a general optical transmitter used for a digital coherent system.

The optical transmission unit 104 is different from the general optical transmitter 800 illustrated in FIG. 11 in that the former has the polarization rotators 3 and 13 and the pre-PMD adders 4 and 14. CW (continuous wave) light outputted by the light source 1 is bifurcated. The bifurcated CW light is subjected to phase modulation and intensity modulation in the optical modulators 2 and 12 by transmitted information, and thus becomes signal light. The optical modulator 2 is an optical modulator for X polarization and the optical modulator 12 is an optical modulator for Y polarization. The modulated X polarization-side signal light and the modulated Y polarization-side signal light propagate through optical paths in the optical transmission unit 104 as signal light whose polarization planes are orthogonal to each other. The X polarization-side signal light and the Y polarization-side signal light respectively pass through the polarization rotators 3 and 13 and the pre-PMD adders 4 and 14, and then are polarization-multiplexed in the polarization multiplexer 5 (orthogonal polarization multiplexing). In the following description, unless otherwise specifically mentioned, since the configurations and operations of the same blocks as those of the optical transmitter 800 described in FIG. 11 are the same in the optical transmission unit 104, a description duplicated with that of the optical transmitter 800 and a description for operations common to that of a general coherent optical transmitter are omitted.

The polarization rotators 3 and 13 output the X polarization-side signal light and the Y polarization-side signal light while temporally changing the angles of polarization planes of the X polarization-side signal light and the Y polarization-side signal light. The polarization rotators 3 and 13, for example, allow the signal light to pass through two ¼ wavelength plates, thereby controlling the rotation amounts of the ¼ wavelength plates. The polarization rotators 3 and 13 may be controlled by control circuits built therein, or may control the rotation amounts of polarized waves by external control.

The pre-PMD adders 4 and 14 add polarization mode dispersion (PMD) to the X polarization-side signal light and the Y polarization-side signal light, respectively. As the pre-PMD adders 4 and 14, for example, an optical fiber having a high PMD is used. Detailed operations of the polarization rotators 3 and 13 and the pre-PMD adders 4 and 14 will be described later.

FIG. 3 is a block diagram illustrating a configuration of the optical reception unit 105. The optical reception unit 105 is a digital coherent receiver, receives the coherent-modulated signal light and demodulates transmitted information included in the signal light by digital signal processing. The optical reception unit 105 includes a PBS (polarization beam splitter) 21, optical hybrid circuits 22 and 23, an AD conversion unit 24, and a wavelength dispersion compensation unit 25. The optical reception unit 105 further includes a pre-PMD compensation unit 26, an adaptive equalization unit 27, a frequency offset compensation unit 28, a carrier phase estimation unit 29, and an identification determination unit 30.

Figure 12:
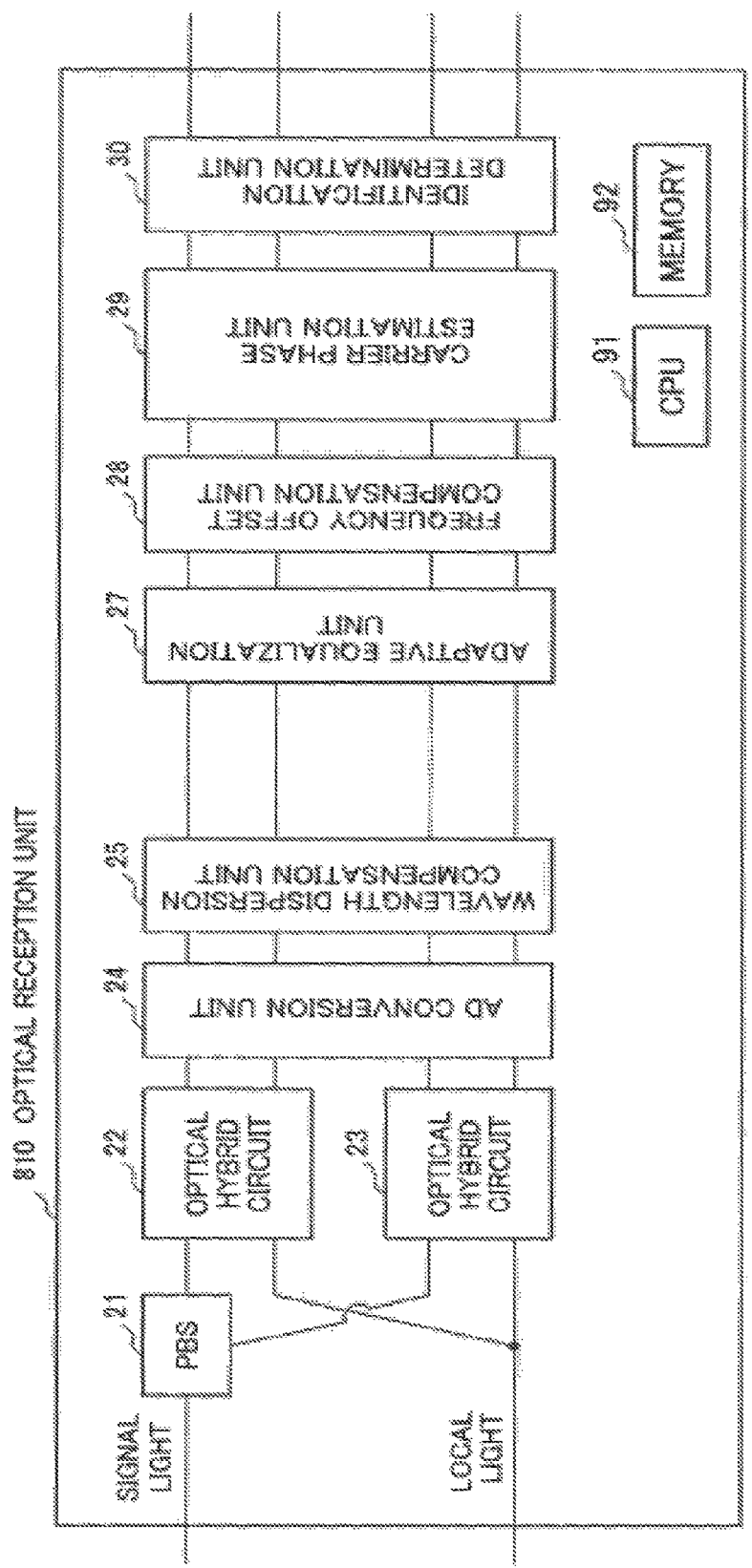
FIG. 12 is a block diagram illustrating a configuration of a general optical receiver used for a digital coherent system.

The configuration of the optical reception unit 105 illustrated in FIG. 3 is different from the optical receiver 810 illustrated in FIG. 12 in that the optical reception unit 105 includes the pre-PMD compensation unit 26. In the following description, unless otherwise specifically mentioned, since the configurations and operations of the same blocks as those of the optical receiver 810 are the same in the optical reception unit 105, a description duplicated with that of the optical receiver 810 and a description for operations common to that of a general digital coherent optical receiver are omitted.

The optical reception unit 105 may further include a CPU (central processing unit) 91 and a memory 92. The memory 92 stores a program that is executed in the CPU 91. The memory 92 is a non-transitory storage medium, and for example, is configured with a non-volatile semiconductor memory and a volatile semiconductor memory. However, the configuration of the memory 92 is not limited thereto. The CPU 91 may execute the program stored in the memory 92, thereby controlling each element of the optical reception unit 105 and performing the functions of the optical reception unit 105.

In the optical reception unit 105, digital reception signals outputted from the AD conversion unit 24 are subjected to digital signal processing in the wavelength dispersion compensation unit 25, the pre-PMD compensation unit 26, the adaptive equalization unit 27, the frequency offset compensation unit 28, the carrier phase estimation unit 29, and the identification determination unit 30.

(Operation of Optical Transmission Unit)

The operation of the optical transmission unit 104 will be described. In the optical transmission unit 104 of the present example embodiment, the X polarization-side pre-PMD adder 4 and the Y polarization-side pre-PMD adder 14 add similar pre-PMDs to signal light.

Figure 4:
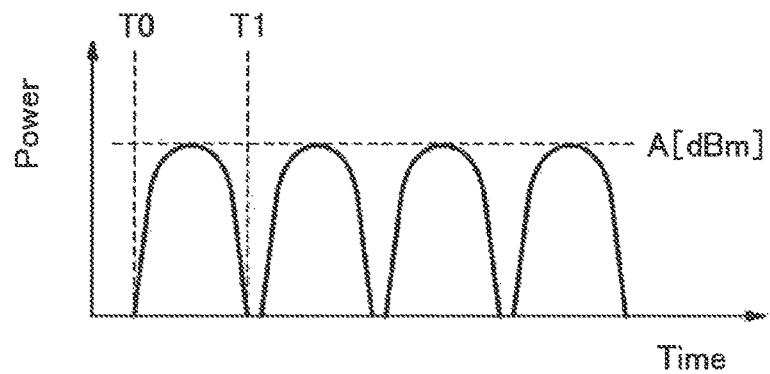
FIG. 4 is a diagram illustrating an example of a waveform before addition of pre-PMD which is a symbol column of X polarization-side signal light.
Figure 5:
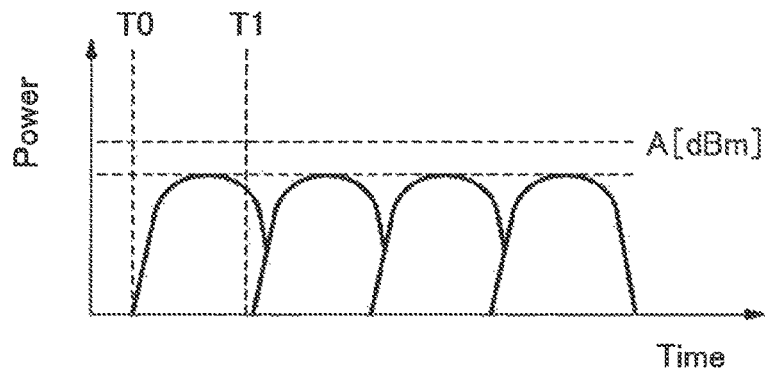
FIG. 5 is a diagram illustrating an example of a waveform after addition of pre-PMD which is a symbol column of X polarization-side signal light.
Figure 6:
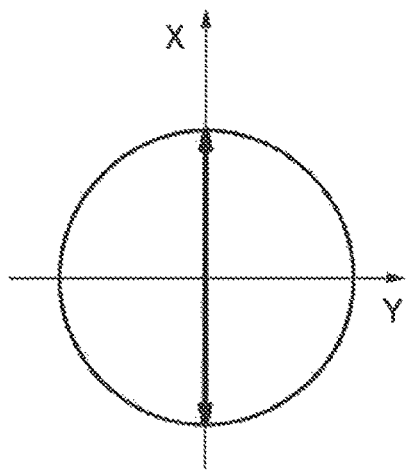
FIG. 6 is a diagram illustrating an example of a polarization direction before addition of pre-PMD to X polarization-side signal light.
Figure 7:
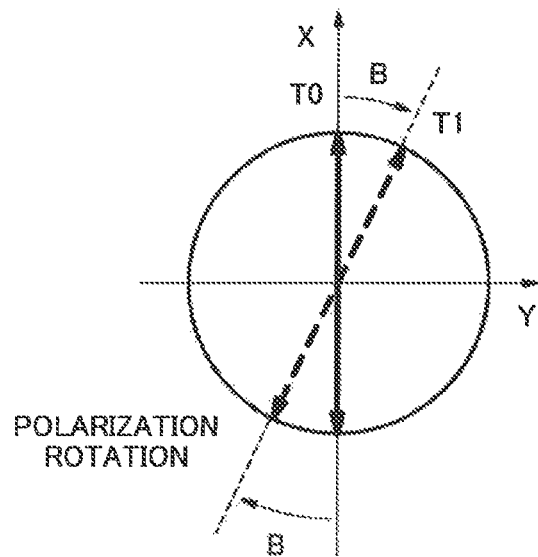
FIG. 7 is a diagram illustrating an example of a polarization direction after addition of pre-PMD to X polarization-side signal light.

FIG. 4 and FIG. 5 are diagrams illustrating examples of waveforms before and after addition of the pre-PMD which is a symbol column (a pulse train) of X polarization-side signal light. FIG. 6 and FIG. 7 are diagrams illustrating examples of polarization directions before and after the addition of the pre-PMD of X polarization-side signal light. In the first example embodiment, the optical modulator 2 outputs signal light having power and shape illustrated in FIG. 4 as a pulse train. Peak power of the signal light illustrated in FIG. 4 is A (dBm), and signal light outputted from the polarization rotator 3 is linearly polarized in a polarization direction (an X axis direction) illustrated in FIG. 6 at a time T0.

In the present example embodiment, first, the polarization rotator 3 continuously changes an angle of a polarization plane of outputted signal light to a maximum rotation angle B from an X axis from times T0 to T1 as illustrated in FIG. 7. Time T0 indicates a rise start time of a pulse of signal light (hereinafter, referred to as a "pulse"), and time T1 indicates a pulse fall completion time. By such an operation, polarization rotation of the angle B is added for each pulse outputted from the polarization rotator 3.

The signal light with the added polarization rotation is inputted to the pre-PMD adder 4. The pre-PMD adder 4 adds delay, which corresponds to a polarization direction of the inputted signal light, to the signal light. In the present example embodiment, the added delay amount is minimum when the polarization plane of the signal light inputted to the pre-PMD adder 4 is the X axis direction of FIG. 7, and increases together with an increase in the rotation angle of the polarization plane. The delay amount becomes maximum when the polarization plane of the inputted signal light is the Y axis direction. That is, the pre-PMD adder 4 adds minimum delay to the pulse at the pulse rise start time T0 and adds maximum delay to the pulse at the pulse fall completion time T1.

After the polarization rotation of one pulse ends, the polarization rotator 3 may be controlled in such a way that the angle of the polarization plane of the signal light outputted from the polarization rotator 3 returns to an angle at a rise start time point of a pulse (the X axis direction) up to a rise start time of a next pulse. For example, the polarization rotator 3 is controlled in such a way as to rotate counterclockwise in order to return the angle of the polarization plane to the position of the rise start time point of the pulse.

By the operation of the polarization rotator 3, the rotation angle of polarization increases during a period from the rise start to the fall completion of a pulse inputted to the pre-PMD adder 4. Accordingly, delay of the pulse outputted from the pre-PMD adder 4 increases. As a consequence, the pulse is temporally widened, so that a pre-PMD is added. Parameters (for example, an amount of the pre-PMD, a polarization rotation angle, and a delay time) of the added pre-PMD may be constant or may differ for each pulse.

In FIG. 4 to FIG. 7, the procedure in which the pre-PMD is added to the X polarization-side signal light has been described. The optical transmission unit 104 adds the pre-PMD, which is similar to that of the X polarization-side signal light, to the Y polarization-side signal light by using the polarization rotator 13 and the pre-PMD adder 14. That is, the polarization rotator 13, during a time period from time T0 to time T1, continuously changes the angle of the polarization plane of the pulse of the inputted Y polarization-side signal light to the maximum rotation angle B from the Y axis direction, and outputs the signal light. By such an operation of the polarization rotator 13, the polarization rotation of the angle B is also added to the Y polarization-side signal light within one pulse. The pre-PMD adder 14 adds delay, which corresponds to the polarization direction of the inputted Y polarization-side signal light, to the Y polarization-side signal light.

Figure 8:
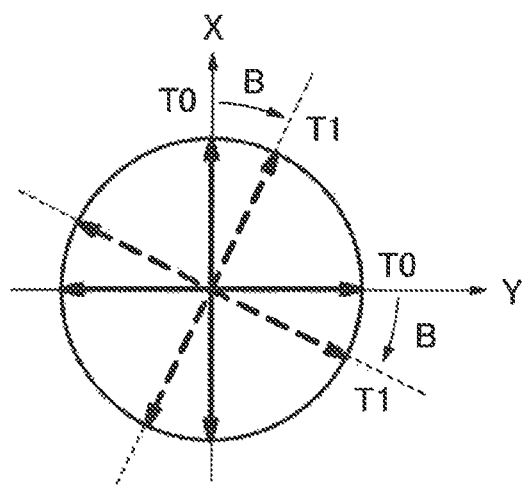
FIG. 8 is a diagram illustrating an example of a polarization direction of signal light whose polarization is multiplexed in a polarization multiplexer.

FIG. 8 is a diagram illustrating an example of the polarization direction of the signal light polarization-multiplexed in the polarization multiplexer 5. Delay, which corresponds to polarization rotation and a rotation amount from 0 to B for each pulse, is added to all of the X polarization-side signal light and the Y polarization-side signal light as a pre-PMD. The polarization multiplexer 5 polarization-multiplexes the X polarization-side signal light and the Y polarization-side signal light to each of which the pre-PMD has been added, and outputs the multiplexed signal light to the optical multiplexing unit 107.

In the optical transmission unit 104, the pre-PMD is added to the signal light, so that all the X polarization-side and Y polarization-side pulses have a shape with a wide range of time as illustrated in FIG. 5. In general, higher peak power of signal light transmitted through the optical fiber transmission path 103, more easily quality deterioration occurs due to a non-linear phenomenon. In the present example embodiment, since the pulse is widened in a time direction when the pre-PMD is added, peak power when the pre-PMD is added is lower than peak power (A (dBm) of FIG. 4) of a pulse before a pre-PMD is added. As a consequence, deterioration in transmission quality due to the non-linear phenomenon of signal light in the optical fiber transmission path 103 is suppressed.

Since a delay amount becomes large as the maximum rotation angle B of the polarization plane of the polarization rotators 3 and 13 is large, peak power of a pulse is also lowered. That is, larger the maximum rotation angle B is, an influence due to the non-linear phenomenon is more suppressed. Accordingly, the maximum rotation angle B may be set to be as large as possible within the range of polarization rotation capability of the polarization rotators 3 and 13 and PMD compensation capability in the optical reception unit 105.

(Operation of Optical Reception Unit)

Next, the operation of the optical reception unit 105 will be described. The optical reception unit 105 illustrated in FIG. 3 is different from the general optical receiver 810 illustrated in FIG. 12 in that the optical reception unit 105 further includes the pre-PMD compensation unit 26 which compensates for the pre-PMD. The parameters of the pre-PMD added in the optical transmission unit 104 are shared by the optical transmission unit 104 and the optical reception unit 105, and are stored in the pre-PMD compensation unit 26.

The optical reception unit 105 illustrated in FIG. 3 includes the pre-PMD compensation unit 26 between the wavelength dispersion compensation unit 25 and the adaptive equalization unit 27. The optical reception unit 105 performs compensation of a PMD, which occurs in a transmission path, in the adaptive equalization unit 27 similarly to the optical receiver 810. The optical reception unit 105 further compensates for the pre-PMD, which has been added in the optical transmission unit 104, in the pre-PMD compensation unit 26. The pre-PMD compensation unit 26 of the present example embodiment includes a digital filter. A change amount of a polarization direction of signal light and an amount of a PMD added to the signal light are expressed as functions of times. Accordingly, the optical reception unit 105 can compensate for the pre-PMD, which has been added in the optical transmission unit 104, by a digital signal operation process in the pre-PMD compensation unit 26 having a function of a digital filer that inversely equalizes the pre-PMD.

As described above, in the optical fiber transmission system 100 of the first example embodiment, the optical transmission unit 104 adds a pre-PMD to respective signal light to be subjected to orthogonal polarization multiplexing, and temporally spreads optical power and a polarization direction in a symbol of the signal light. As a consequence, an influence of the non-linear phenomenon to signal light in the optical fiber transmission path is suppressed.

That is, in the optical fiber transmission system 100 of the first example embodiment, it is possible to suppress deterioration in the quality of signal light due to the non-linear phenomenon.

In addition, in the optical fiber transmission system 100 illustrated in FIG. 1, digital coherent signals having a plurality of wavelengths are wavelength-multiplexed in the optical multiplexing unit 107 and are transmitted as a WDM signal light. However, transmitted signal light may not be WDM signal light. That is, the optical transmitting apparatus 101 and the optical receiving apparatus 102 of the first example embodiment can also be applied to a system that does not have the optical multiplexing unit 107 and the optical demultiplexing unit 108 and transmits signal light having a single wavelength. Furthermore, the optical fiber transmission system 100 may also be a non-relayed optical transmission system that does not have the optical amplifier 109.

In addition, the effect of the first example embodiment is also achieved by the following polarization dispersion adder. That is, the polarization dispersion adder includes a polarization rotator (the polarization rotator 3) and a delay adder (the pre-PMD adder 4). The polarization rotator rotates the polarization of a pulse and outputs signal light for each pulse of signal light generated by modulating an optical carrier during a period from the pulse rise start time T0 to the pulse fall completion time T1. The delay adder adds delay of an amount corresponding to the rotation amount of the polarization added by the polarization rotator to the pulse outputted from the polarization rotator.

The polarization dispersion adder having such a configuration adds a pre-PMD to signal light and temporally spreads optical power and a polarization direction in a symbol of the signal light. As a consequence, an effect is achieved in which the aforementioned polarization dispersion adder can suppress an influence of the non-linear phenomenon to signal light in the optical fiber transmission path.

Moreover, the effect of the first example embodiment is also achieved by the following optical receiver having a minimum configuration. That is, the optical receiver having a minimum configuration includes a polarization beam splitter (the PBS 21), optical hybrid circuits (the optical hybrid circuits 22 and 23), an AD converter (the AD conversion unit 24), and a polarization mode dispersion compensation unit (the pre-PMD compensation unit 26). The polarization beam splitter polarization-splits received signal light. The optical hybrid circuit converts the signal light polarization-split in the polarization beam splitter into an analog electrical signal. The AD converter converts the analog electrical signal outputted by the optical hybrid circuit into a digital reception signal. The polarization mode dispersion compensation unit compensates for PMD (polarization mode dispersion) added at the time of transmission of the signal light included in the digital reception signal.

The optical receiver having such a minimum configuration can compensate for the PMD added at the time of transmission of the signal light by a digital signal operation process in the polarization mode dispersion compensation unit having a function of a digital filter that inversely equalizes the PMD. As a consequence, an effect is achieved in which the optical receiver having the minimum configuration can suppress an influence of the non-linear phenomenon to signal light in the optical fiber transmission path.

Subsequently, modification examples of the present example embodiment will be described. Also in these modification examples, the pre-PMD is added in the optical transmission unit and the added pre-PMD is compensated in the optical reception unit. Accordingly, the following modification examples of the first example embodiment also achieve the aforementioned effects that it is possible to suppress deterioration in the quality of signal light due to the non-linear phenomenon.

First Modification Example of First Example Embodiment

When the pre-PMD is added to signal light in the optical transmission unit 104, it is preferable that a delay time of the pre-PMD is set in such a way that a symbol of the signal light after the addition of the pre-PMD does not overlap with a next symbol. However, even when symbols overlap with each other by the addition of the pre-PMD, inter-symbol interference occurring by the overlapping of the symbols, for example, can be compensated in the wavelength dispersion compensation unit 25 of the optical reception unit 105. Accordingly, if the delay time of the pre-PMD can be compensated at the time of reception, it may be set to an amount enough for overlapping with a symbol after the next symbol.

Second Modification Example of First Example Embodiment

In FIG. 7, the rotation amount and the delay amount of the polarization plane gradually increase toward the pulse fall completion time T1 by employing the pulse rise start time T0 of the signal light as a minimum value. Parameters of the pre-PMD, such as the angle of the polarization plane and the rotation direction of the polarization plane at respective times such as a rise start time, a peak time, and a fall completion time of a pulse, are not limited to the example described in the first example embodiment. The parameters are arbitrarily set, so that a pulse with the added pre-PMD can be formed to a specific shape.

Third Modification Example of First Example Embodiment

In the first example embodiment, the angle of the polarization plane of the pulse outputted from the polarization rotator 3 for X polarization may return to the X axis direction before pulse rise start. However, the control direction of the polarization rotator 3 may be controlled to be always the same direction. This also applies to the polarization rotator 13 for Y polarization.

For example, after pulse fall completion, an amount of a PMD to be added in the pre-PMD adder 4 may be switched to setting in which the amount is a minimum delay amount at the Y axis perpendicular to the X axis and is a maximum delay amount at the X axis. In this case, after the operation from the time T0 to the time T1 of FIG. 7, the angle of the polarization plane of a pulse outputted from the polarization rotator 3 is moved to a direction coinciding with the Y axis through further clockwise rotation. Then, rotation of the polarization plane of a next pulse is started. After the rotation of the polarization plane ends, the position of the polarization rotator 3 is moved to a direction coinciding with the X axis through further clockwise rotation. By such an operation, it is possible to add a pre-PMD similar to that of a continuous pulse while continuously rotating the polarization rotator 3 in the same direction. As a consequence, control of rotation of the polarization rotator is simplified.

Fourth Modification Example of First Example Embodiment

A rotation speed of polarization by the polarization rotators 3 and 13 and a temporal change in a delay amount by the pre-PMD adders 4 and 14 may be constant or not constant during a period from the pulse rise start time T0 to the fall completion time T1 of signal light. The delay amount by the pre-PMD adder 4 is arbitrarily controlled, so that a pulse with the added pre-PMD can be formed to a desired shape.

Fifth Modification Example of First Example Embodiment

In the first example embodiment, the parameters of the pre-PMD added to the X polarization-side signal light and the Y polarization-side signal light are equal to each other; however, each signal light of polarization may be added with a pre-PMD by different parameters.

Sixth Modification Example of First Example Embodiment

The position of the pre-PMD compensation unit 26 of the optical reception unit 105 illustrated in FIG. 3 is not limited to the example of FIG. 3. The pre-PMD compensation unit 26, for example, may be arranged before the wavelength dispersion compensation unit 25.

Seventh Modification Example of First Example Embodiment

In the first example embodiment, the parameters of the pre-PMD added in the optical transmission unit 104 have been described to be shared in advance by the optical transmission unit 104 and the optical reception unit 105. When a change in the parameters of the pre-PMD in the optical transmission unit 104 is immediately reflected in the optical reception unit 105, the optical transmission unit 104 may change the parameters of the pre-PMD as needed. In order to immediately notify the optical reception unit 105 of the change in the parameters of the pre-PMD from the optical transmission unit 104, the parameters of the pre-PMD may be notified through a channel (for example, a channel for supervisory control) different from that of signal light passing through the optical fiber transmission path 103. The parameters of the pre-PMD are changed as needed, so that a more preferable amount of pre-PMD of corresponding to a change in transmission conditions of signal light such as a change in a speed of signal light can be added to the signal light.

Eighth Modification Example of First Example Embodiment

In the optical reception unit 105 illustrated in FIG. 3, an inverse function of the pre-PMD added in the optical transmission unit 104 is subjected to the digital signal processing in the pre-PMD compensation unit 26, so that the pre-PMD is compensated. However, the adaptive equalization unit 27 may have a procedure for estimating a pre-PMD amount of received signal light, and autonomously estimating and compensating for a compensation amount of the pre-PMD. The adaptive equalization unit 27 autonomously compensates for the pre-PMD, so that it is possible to unify the function of the pre-PMD compensation unit 26 and the function of the adaptive equalization unit 27, and it is not necessary to share the parameters of the pre-PMD between the optical transmission unit 104 and the optical reception unit 105.

Ninth Modification Example of First Example Embodiment

In the first example embodiment, the optical reception unit 105 performs the pre-PMD compensation by the digital signal processing. However, the pre-PMD compensation may be optically performed for signal light.

Second Example Embodiment

Figure 9:
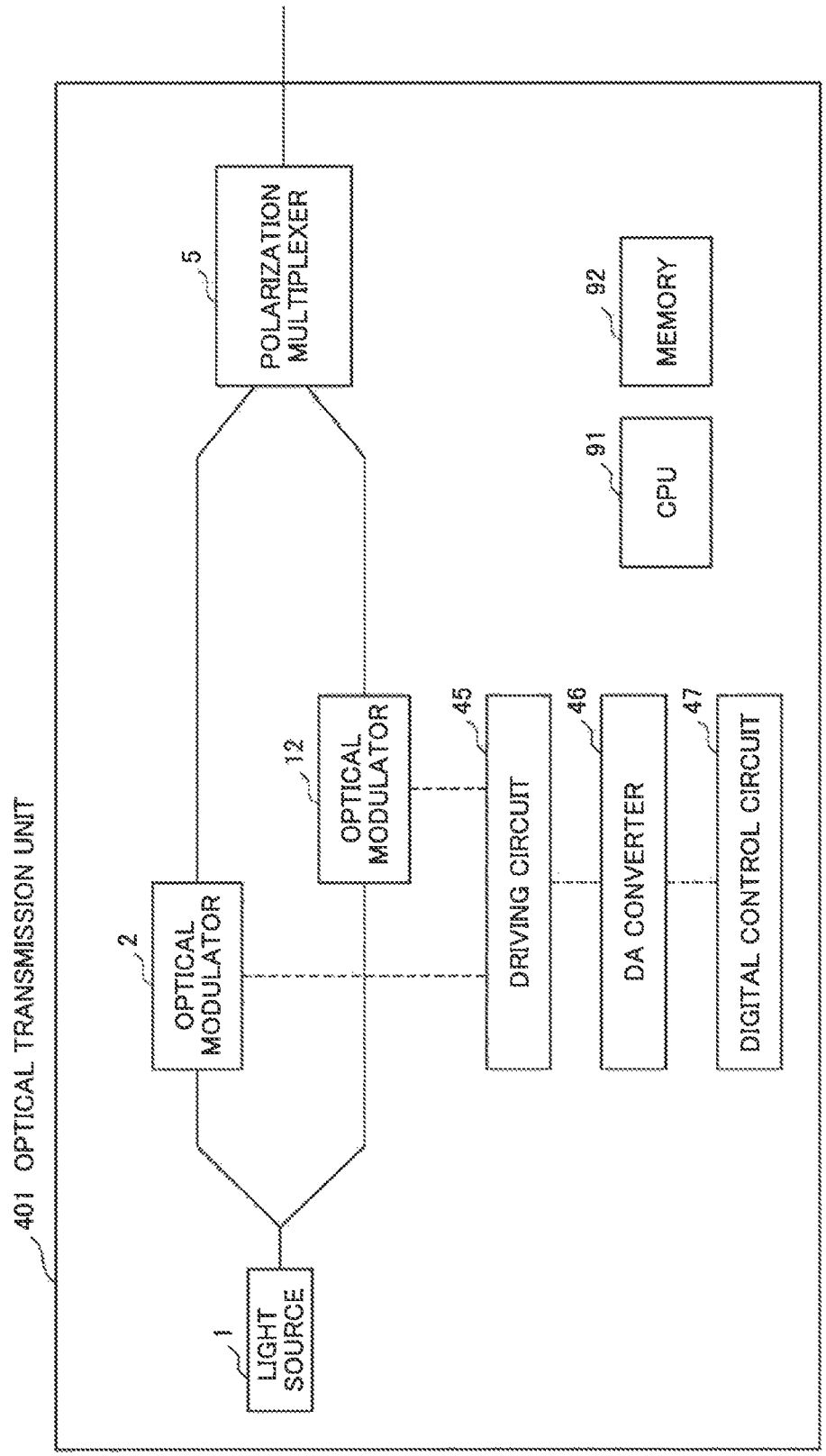
FIG. 9 is a block diagram illustrating a configuration of an optical transmission unit of a second example embodiment.

FIG. 9 is a block diagram illustrating a configuration of an optical transmission unit 401 of a second example embodiment. The optical transmission unit 401 includes the light source 1, the optical modulators 2 and 12, a driving circuit 45, a DA (digital to analog) converter 46, a digital control circuit 47, and the polarization multiplexer 5. The functions of the light source 1, the optical modulators 2 and 12, and the polarization multiplexer 5 included in the optical transmission unit 401 are similar to those of the optical transmission unit 104 of the first example embodiment. The optical transmission unit 401 may further include the CPU 91 and the memory 92. The CPU 91 may execute a program stored in the memory 92, thereby controlling each element of the optical transmission unit 401 and performing the functions of the optical transmission unit 401.

The optical transmission unit 104 described in the first example embodiment adds a pre-PMD to signal light by using the polarization rotators 3 and 13 and the pre-PMD adders 4 and 14. In contrast, in the optical transmission unit 401, signal light which has a waveform and added with pre-PMD is generated in the optical modulator 2 of X polarization-side and the optical modulator 12 of Y polarization-side. Waveforms of driving signals of the optical modulators 2 and 12 are controlled by the digital control circuit 47 and the DA converter 46 in such a way that the signal light with the added pre-PMD is generated.

By such a configuration, the optical transmission unit 401 of the second example embodiment adds the pre-PMD to signal light. That is, the optical transmission unit 401 can add the pre-PMD to the signal light without using the polarization rotators 3 and 13 and the pre-PMD adders 4 and 14 illustrated in FIG. 1. In the optical transmission unit 401, the configuration of the optical system is simplified, so that it is possible to simplify a procedure for improving optical characteristics and controlling optical parts.

Third Example Embodiment

Figure 10:
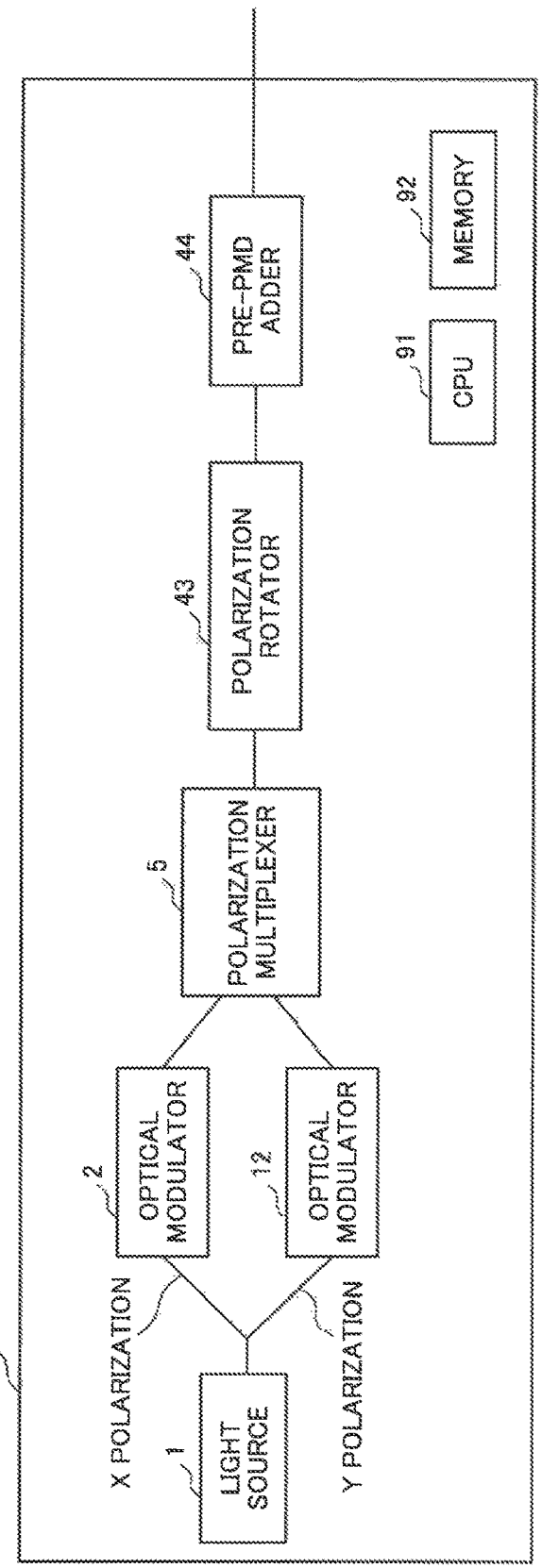
FIG. 10 is a block diagram illustrating a configuration of an optical transmission unit of a third example embodiment.

FIG. 10 is a block diagram illustrating a configuration of an optical transmission unit 801 of a third example embodiment of the present invention. In the optical transmission unit 801, a polarization rotator 43 and a pre-PMD adder 44 are arranged at a rear stage of the polarization multiplexer 5. The polarization rotator 43 and the pre-PMD adder 44 have functions similar to those of the polarization rotator 3 and the pre-PMD adder 4 included in the optical transmission unit 104 of the first example embodiment. The optical transmission unit 801 may further include the CPU 91 and the memory 92. The CPU 91 may execute a program stored in the memory 92, thereby controlling each element of the optical transmission unit 801 and performing the functions of the optical transmission unit 401.

When a rise start time and a fall completion time of a pulse of X polarization-side signal light and Y polarization-side signal light coincide with each other, it is possible to simultaneously add similar pre-PMDs to both the signal light of the X polarization and signal light of the Y polarization by one polarization rotator 43 and one pre-PMD adder 44. As a consequence, the configuration of the optical transmission unit 801 of the third example embodiment can be simplified as compared with the optical transmission unit 104 of the first example embodiment.

So far, the present invention has been described with reference to example embodiments and modification examples thereof; however, the present invention is not limited to the aforementioned example embodiments and modification examples. Various modifications which can be understood by a person skilled in the art can be made in the configuration and details of the present invention within the scope of the present invention. For example, the aforementioned example embodiments and modification examples are arbitrarily combined for use in a range in which the effects of the present invention are achieved.

In addition, the example embodiments of the present invention are also written in the following supplementary notes, but are not limited thereto.

(Supplementary Note 1)

A polarization dispersion adder comprising:

polarization rotation means for rotating polarization of a pulse for each pulse of signal light generated by modulating an optical carrier during a period from a rise start time T0 of the pulse to a fall completion time T1 of the pulse and outputting the pulse; and delay addition means for adding an amount of delay corresponding to a rotation amount of the polarization added by the polarization rotation means to the pulse outputted from the polarization rotation means.

(Supplementary Note 2)

The polarization dispersion adder according to Supplementary note 1, wherein the polarization rotation means is controlled in such a way that a rotation direction of polarization is always the same.

(Supplementary Note 3)

The polarization dispersion adder according to Supplementary note 1 or 2, wherein the polarization rotation means rotates and outputs the polarization of the signal light at a constant rotation speed during a period from the time T0 to the time T1.

(Supplementary Note 4)

The polarization dispersion adder according to any one of Supplementary notes 1 to 3, wherein the delay addition means adds minimum delay to the pulse at the time T0 and adds maximum delay to the pulse at the time T1.

(Supplementary Note 5)

The polarization dispersion adder according to any one of Supplementary notes 1 to 4, wherein a temporal change rate of the delay amount added by the delay addition means is constant during the period from the time T0 to the time T1

(Supplementary Note 6)

A optical transmitter comprising:

a light source for generating an optical carrier;

first optical modulation means for modulating one of bifurcated optical carriers and inputting the one modulated optical carrier to a first dispersion adder;

second optical modulation means for modulating a remaining one of the bifurcated optical carriers and inputting the remaining one modulated optical carrier to a second dispersion adder;

first dispersion addition means for adding predetermined delay to light inputted from the first optical modulation means, the first dispersion addition means being the polarization dispersion adder according to any one of Supplementary notes 1 to 5;

second dispersion addition means for adding predetermined delay to light inputted from the second optical modulation means, the second dispersion addition means being the polarization dispersion adder according to any one of Supplementary notes 1 to 5; and polarization multiplexing means for polarization-multiplexing and outputting light outputted from the first and second dispersion addition means.

(Supplementary Note 7)

An optical transmitter comprising:

a light source for generating an optical carrier;

first optical modulation means for modulating one of bifurcated optical carriers and generating first signal light;

second optical modulation means for modulating a remaining one of the bifurcated optical carriers and generating second signal light;

polarization multiplexing means for polarization-multiplexing and outputting the first and second signal light, and the polarization dispersion adder according to any one of Supplementary notes 1 to 5 for receiving the polarization-multiplexed first and second signal light.

(Supplementary Note 8)

A optical transmitter comprising:

a light source for generating a optical carrier;

first optical modulation means for modulating one of bifurcated optical carriers, adding predetermined polarization mode dispersion for each light pulse of the one of the bifurcated optical carriers modulated, and outputting the light pulse;

second optical modulation means for modulating a remaining one of the bifurcated optical carriers, adding predetermined polarization mode dispersion for each light pulse of the remaining one of the bifurcated optical carriers modulated, and outputting the light pulse; and polarization multiplexing means for polarization-multiplexing and outputting light outputted from the first and second optical modulation means.

(Supplementary Note 9)

An optical receiver comprising:

a polarization beam splitter for polarization-splitting received signal light;

an optical hybrid circuit for converting the polarization-split signal light into an analog electrical signal;

AD (analog to digital) conversion means for converting the analog electrical signal into a digital reception signal; and polarization mode dispersion compensation means for compensating for polarization mode dispersion that is included in the signal light and added at the time of transmission of the signal light.

(Supplementary Note 10)

The optical receiver according to Supplementary note 9, wherein the polarization mode dispersion compensation means stores a parameter of the polarization mode dispersion added at the time of transmission of the signal light, and electrically compensates for the polarization mode dispersion included in the signal light based on the stored parameter.

(Supplementary Note 11)

The optical receiver according to Supplementary note 10, wherein the parameter is notified to the optical receiver by a channel different from that of the signal light.

(Supplementary Note 12)

The optical receiver according to Supplementary note 9, wherein the polarization mode dispersion compensation means estimates a polarization mode dispersion amount of the signal light by performing an operation process with respect to the digital reception signal, and electrically compensates for the polarization mode dispersion added at the time of transmission of the signal light.

(Supplementary Note 13)

The optical receiver according to Supplementary note 9, wherein the compensation of the polarization mode dispersion added at the time of transmission of the signal light is optically performed for the signal light.

(Supplementary Note 14)

An optical transmitting apparatus comprising:

the optical transmitter according to any one of Supplementary notes 6 to 8 for outputting signal light having respectively different wavelengths, and optical multiplexing means for multiplexing the signal light having respectively different wavelengths and outputting the signal light as a wavelength multiplexing optical signal.

(Supplementary Note 15)

An optical receiving apparatus comprising:

optical demultiplexing means for receiving a wavelength multiplexing optical signal and demultiplexing the wavelength multiplexing optical signal into signal light having a single wavelength; and the optical receiver according to any one of Supplementary notes 9 to 13 for receiving the signal light demultiplexed in the optical demultiplexing means.

(Supplementary Note 16)

An optical fiber transmission system connected to an optical fiber transmission path in such a way that wavelength multiplexing signal light transmitted from the optical transmitting apparatus according to Supplementary note 14 is received in the optical receiving apparatus according to Supplementary note 15.

(Supplementary Note 17)

A polarization dispersion addition method comprising the steps of:

rotating polarization of a pulse for each pulse of signal light generated by modulating an optical carrier during a period from a rise start time T0 of the pulse to a fall completion time T1 of the pulse, and adding an amount of delay corresponding to a rotation amount of the polarization added by the rotation to the pulse subjected to the rotation of the polarization.

(Supplementary Note 18)

A polarization mode dispersion compensation method comprising the steps of:

polarization-splitting received signal light;

converting the polarization-split signal light into an analog electrical signal;

converting the analog electrical signal into a digital reception signal; and compensating for polarization mode dispersion that is included in the signal light and added at the time of transmission of the signal light.

(Supplementary Note 19)

A control program of a polarization dispersion adder causing a computer to perform:

a process of rotating polarization of a pulse for each pulse of signal light generated by modulating an optical carrier during a period from a rise start time T0 of the pulse to a fall completion time T1 of the pulse; and a process of adding an amount of delay corresponding to a rotation amount of the polarization added by the rotation to the pulse subjected to the rotation of the polarization.

(Supplementary Note 20)

A control program of an optical receiver causing a computer to perform:

a process of converting polarization-split signal light into an analog electrical signal;

a process of converting the analog electrical signal into a digital reception signal; and a process of compensating for polarization mode dispersion that is included in the signal light and added at the time of transmission of the signal light.

This application claims priority based on Japanese Application No. 2014-173766 filed on Aug. 28, 2014, the content of which is incorporated herein in its entirety by reference.

REFERENCE SIGNS LIST

1 Light source
2, 12 Optical modulator
3, 13, 43 Polarization rotator
4, 14, 44 Pre-PMD adder
5 Polarization multiplexer
21 PBS
22, 23 Optical hybrid circuit
24 AD conversion unit
25 Wavelength dispersion compensation unit
26 Pre-PMD compensation unit
27 Adaptive equalization unit
28 Frequency offset compensation unit
29 Carrier phase estimation unit
30 Identification determination unit
45 Driving circuit
46 DA converter
47 Digital control circuit
91 CPU
92 Memory
100 Optical fiber transmission system
101 Optical transmitting apparatus
102 Optical receiving apparatus
103 Optical fiber transmission path
104, 801 Optical transmission unit
105 Optical reception unit
107 Optical multiplexing unit
108 Optical demultiplexing unit
109 Optical amplifier
110 Optical fiber
800 Optical transmitter
810 Optical receiver

The invention claimed is:

1. A polarization dispersion adder comprising:

a polarization rotator for continuously changing an angle of a polarization plane of a pulse for each pulse of signal light generated by modulating an optical carrier during a period from a rise start time T0 of the pulse to a fall completion time T1 of the pulse and outputting the pulse; and a delay adder for adding an amount of delay corresponding to a change amount of the polarization plane added by the polarization rotator to the pulse outputted from the polarization rotator.

2. The polarization dispersion adder according to claim 1, wherein the delay adder adds minimum delay to the pulse at the time T0 and adds maximum delay to the pulse at the time T1.

3. An optical transmitter comprising:

a light source for generating an optical carrier;

a first optical modulator for modulating one of bifurcated optical carriers and inputting the one modulated optical carriers to a first dispersion adder;

a second optical modulator for modulating a remaining one of the bifurcated optical carriers and inputting the remaining one modulated optical carriers to a second dispersion adder;

a first dispersion adder for adding predetermined delay to light inputted from the first optical modulator, the first dispersion adder being the polarization dispersion adder according to claim 2;
a second dispersion adder for adding predetermined delay to light inputted from the second optical modulator, the second dispersion adder being the polarization dispersion adder according to claim 2; and
a polarization multiplexer for polarization-multiplexing and outputting light outputted from the first and second dispersion adder.

4. An optical transmitter comprising:
a light source for generating an optical carrier;
a first optical modulator for modulating one of bifurcated optical carriers and generating first signal light;
a second optical modulator for modulating a remaining one of the bifurcated optical carriers and generating second signal light;
a polarization multiplexer for polarization-multiplexing and outputting the first and second signal light; and
the polarization dispersion adder according to claim 3 for receiving the polarization-multiplexed first and second signal light.

5. An optical transmitter comprising:
a light source for generating an optical carrier;
a first optical modulator for modulating one of bifurcated optical carriers and generating first signal light;
a second optical modulator for modulating a remaining one of the bifurcated optical carriers and generating second signal light;
a polarization multiplexer for polarization-multiplexing and outputting the first and second signal light; and
the polarization dispersion adder according to claim 2 for receiving the polarization-multiplexed first and second signal light.

6. An optical transmitter comprising:
a light source for generating an optical carrier;
a first optical modulator for modulating one of bifurcated optical carriers and generating first signal light;
a second optical modulator for modulating a remaining one of the bifurcated optical carriers and generating second signal light;
a polarization multiplexer for polarization-multiplexing and outputting the first and second signal light; and
the polarization dispersion adder according to claim 5 for receiving the polarization-multiplexed first and second signal light.

7. An optical transmitter comprising:
a light source for generating an optical carrier;
a first optical modulator for modulating one of bifurcated optical carriers and generating first signal light;
a second optical modulator for modulating a remaining one of the bifurcated optical carriers and generating second signal light;
a polarization multiplexer for polarization-multiplexing and outputting the first and second signal light; and
the polarization dispersion adder according to claim 2 for receiving the polarization-multiplexed first and second signal light.

8. An optical transmitter comprising:
a light source for generating an optical carrier;
a first optical modulator for modulating one of bifurcated optical carriers and inputting the one modulated optical carriers to a first dispersion adder;
a second optical modulator for modulating a remaining one of the bifurcated optical carriers and inputting the remaining one modulated optical carriers to a second dispersion adder;
a first dispersion adder for adding predetermined delay to light inputted from the first optical modulator, the first dispersion adder being the polarization dispersion adder according to claim 1;
a second dispersion adder for adding predetermined delay to light inputted from the second optical modulator, the second dispersion adder being the polarization dispersion adder according to claim 1; and
a polarization multiplexer for polarization-multiplexing and outputting light outputted from the first and second dispersion adder.

9. An optical transmitting apparatus comprising:
the optical transmitter according to claim 8 for outputting signal light having respectively different wavelengths; and
an optical multiplexer for multiplexing the signal light having respectively different wavelengths and outputting the signal light as a wavelength multiplexing optical signal.

10. An optical fiber transmission system connected via an optical fiber transmission path in such a way that wavelength multiplexing signal light transmitted from the optical transmitting apparatus according to claim 9 is received by an optical receiving apparatus, wherein
the optical receiving apparatus comprises an optical demultiplexer for receiving a wavelength multiplexing optical signal and demultiplexing the wavelength multiplexing optical signal into signal light having a single wavelength; and an optical receiver for receiving the signal light demultiplexed in the optical demultiplexer, and
wherein
the optical receiver comprises:
a polarization beam splitter for polarization-splitting received signal light;
an optical hybrid circuit for converting the polarization-split signal light into an analog electrical signal;
an AD (analog to digital) converter for converting the analog electrical signal into a digital reception signal; and
a polarization mode dispersion compensator for compensating for polarization mode dispersion that is included in the signal light and added at a time of transmission of the signal light.

11. An optical transmitter comprising:
a light source for generating an optical carrier;
a first optical modulator for modulating one of bifurcated optical carriers and generating first signal light;
a second optical modulator for modulating a remaining one of the bifurcated optical carriers and generating second signal light;
a polarization multiplexer for polarization-multiplexing and outputting the first and second signal light; and
the polarization dispersion adder according to claim 1 for receiving the polarization-multiplexed first and second signal light.

12. The polarization dispersion adder according to claim 1, wherein the polarization rotator is controlled in such a way that a rotation direction of polarization is always the same.

13. The polarization dispersion adder according to claim 1, wherein the polarization rotator rotates and outputs the polarization of the signal light at a constant rotation speed during a period from the time T0 to the time T1.

14. The polarization dispersion adder according to claim 1, wherein a temporal change rate of the delay amount added by the delay adder is constant during the period from the time T0 to the time T1.

15. An optical receiver comprising:
- a polarization beam splitter for polarization-splitting received signal light;
- an optical hybrid circuit for converting the polarization-split signal light into an analog electrical signal;
- an AD (analog to digital) converter for converting the analog electrical signal into a digital reception signal; and
- a polarization mode dispersion compensator for compensating for polarization mode dispersion that is included in the signal light and added at a time of transmission of the signal light;
- wherein the polarization mode dispersion compensator stores a parameter of the polarization mode dispersion added at the time of transmission of the signal light, and electrically compensates for the polarization mode dispersion included in the signal light based on the stored parameter.

16. An optical receiving apparatus comprising:
- an optical demultiplexer for receiving a wavelength multiplexing optical signal and demultiplexing the wavelength multiplexing optical signal into signal light having a single wavelength; and
- the optical receiver according to claim 15 for receiving the signal light demultiplexed in the optical demultiplexer.

17. An optical receiving apparatus comprising:
- an optical demultiplexer for receiving a wavelength multiplexing optical signal and demultiplexing the wavelength multiplexing optical signal into signal light having a single wavelength; and
- the optical receiver according to claim 15 for receiving the signal light demultiplexed in the optical demultiplexer.

18. A polarization dispersion addition method comprising:
- continuously changing, by a polarization rotator, an angle of a polarization plane of a pulse for each pulse of signal light generated by modulating an optical carrier during a period from a rise start time T0 of the pulse to a fall completion time T1 of the pulse; and
- adding an amount of delay corresponding to a change amount of the polarization plane added by the change to the pulse subjected to a rotation of the polarization.

* * * * *